US009864816B2

(12) United States Patent
Liu et al.

(10) Patent No.: US 9,864,816 B2
(45) Date of Patent: Jan. 9, 2018

(54) DYNAMICALLY UPDATING DATA GUIDE FOR HIERARCHICAL DATA OBJECTS

(71) Applicant: Oracle International Corporation, Redwood Shores, CA (US)

(72) Inventors: Zhen Hua Liu, San Mateo, CA (US); Beda Christoph Hammerschmidt, Los Gatos, CA (US); Ying Lu, Sunnyvale, CA (US); Rahul Manohar Kadwe, San Carlos, CA (US); Douglas McMahon, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 198 days.

(21) Appl. No.: 14/699,685

(22) Filed: Apr. 29, 2015

(65) Prior Publication Data

US 2016/0321375 A1  Nov. 3, 2016

(51) Int. Cl.
*G06F 17/30* (2006.01)
(52) U.S. Cl.
CPC .... *G06F 17/30911* (2013.01); *G06F 17/3092* (2013.01); *G06F 17/30917* (2013.01)
(58) Field of Classification Search
CPC ......... G06F 17/30911; G06F 17/30917; G06F 17/3092
USPC ........................................................ 707/741
See application file for complete search history.

(56) References Cited

U.S. PATENT DOCUMENTS

| | | | |
|---|---|---|---|
| 5,870,761 A | 2/1999 | Demers et al. | |
| 5,951,695 A | 9/1999 | Kolovson | |
| 6,108,660 A | 8/2000 | Ikeda et al. | |
| 6,122,630 A | 9/2000 | Strickler et al. | |
| 6,370,622 B1 | 4/2002 | Chiou et al. | |
| 6,611,843 B1 * | 8/2003 | Jacobs | G06F 17/30595 |
| 6,611,898 B1 | 8/2003 | Slattery et al. | |
| 6,836,778 B2 * | 12/2004 | Manikutty | G06F 17/3061 |
| 7,031,994 B2 | 4/2006 | Lao et al. | |
| 7,032,089 B1 | 4/2006 | Ranade et al. | |
| 7,219,102 B2 * | 5/2007 | Zhou | G06F 17/30595 |
| | | | 707/792 |
| 7,292,585 B1 | 11/2007 | Slaughter et al. | |
| 7,454,435 B2 * | 11/2008 | Friedman | G06F 17/30589 |
| 7,493,305 B2 * | 2/2009 | Thusoo | G06F 17/30911 |
| 7,496,589 B1 | 2/2009 | Jain et al. | |
| 7,548,898 B1 | 6/2009 | Tarenskeen et al. | |
| 7,570,451 B2 | 8/2009 | Bedillion et al. | |

(Continued)

OTHER PUBLICATIONS

Liu, Zhen Hua, et al., "A Decade of XML Data Management: An Industrial Experience Report from Oracle", ICDE 2009, Shanghai, China, Mar. 29-Apr. 2, 2009, IEEE Computer Society, pp. 1351-1362.*

(Continued)

*Primary Examiner* — Robert Stevens
(74) *Attorney, Agent, or Firm* — Hickman Palermo Becker Bingham LLP

(57) ABSTRACT

A data guide is dynamically generated. The data guide describes the structures of hierarchical data objects added to a collection of hierarchical data objects. Examples of hierarchical data objects are documents that conform to XML (Extensible Mark-up Language) or data objects that conform to JSON (JavaScript Object Notation). The data guide may be created and/or updated as hierarchical data objects are added to the collection.

28 Claims, 13 Drawing Sheets

(56) References Cited

U.S. PATENT DOCUMENTS

| | | | |
|---|---|---|---|
| 7,912,051 | B1 | 3/2011 | Rowlands et al. |
| 8,306,951 | B2 | 11/2012 | Ghosh et al. |
| 8,612,487 | B2* | 12/2013 | Hui .................. G06F 17/30917 |
| | | | 707/802 |
| 8,832,142 | B2 | 9/2014 | Marwah et al. |
| 2003/0217236 | A1 | 11/2003 | Rowlands |
| 2004/0073754 | A1 | 4/2004 | Cypher |
| 2004/0103105 | A1* | 5/2004 | Lindblad .......... G06F 17/30011 |
| 2004/0122910 | A1 | 6/2004 | Douglass et al. |
| 2004/0143581 | A1 | 7/2004 | Bohannon et al. |
| 2004/0199552 | A1 | 10/2004 | Ward et al. |
| 2005/0065927 | A1 | 3/2005 | Nouri et al. |
| 2006/0010130 | A1 | 1/2006 | Leff et al. |
| 2006/0031233 | A1* | 2/2006 | Liu ..................... G06F 17/2247 |
| 2007/0008890 | A1 | 1/2007 | Tseitlin et al. |
| 2007/0226214 | A1 | 9/2007 | Smits et al. |
| 2007/0239681 | A1* | 10/2007 | Krishnaprasad .. G06F 17/30911 |
| 2008/0010256 | A1* | 1/2008 | Lindblad .......... G06F 17/30911 |
| 2008/0098044 | A1 | 4/2008 | Todd |
| 2008/0140678 | A1 | 6/2008 | Duzett |
| 2008/0155303 | A1 | 6/2008 | Toeroe |
| 2008/0209009 | A1 | 8/2008 | Katwala et al. |
| 2008/0215580 | A1 | 9/2008 | Altinel et al. |
| 2008/0222111 | A1 | 9/2008 | Hoang et al. |
| 2008/0222159 | A1 | 9/2008 | Aranha et al. |
| 2009/0171679 | A1 | 7/2009 | Salgado et al. |
| 2010/0306234 | A1 | 12/2010 | Wang et al. |
| 2011/0071981 | A1 | 3/2011 | Ghosh et al. |
| 2011/0208774 | A1* | 8/2011 | Breining ........... G06F 17/30914 |
| | | | 707/769 |
| 2011/0289118 | A1* | 11/2011 | Chen ................. G06F 17/30917 |
| | | | 707/803 |
| 2012/0284228 | A1 | 11/2012 | Ghosh et al. |
| 2015/0088830 | A1 | 3/2015 | Kamp et al. |
| 2017/0116273 | A1 | 4/2017 | Liu et al. |

OTHER PUBLICATIONS

Haw, Su-Cheng, et al., "Data storage practices and query processing in XML databases: A survey", Knowledge-Based Systems, vol. 24, Issue 8, Dec. 2011, pp. 1317-1340.*

Tekli, Joe, et al., "XML Document-Grammar Comparison: Related Problems and Applications", Central European Journal of Computer Science, vol. 1, © 2011, 14 pages.*

Theobald, Martin, et al., "TopX: efficient and versatile top-k query processing for semistructured data", The VLDB Journal, vol. 17, Issue 1, Jan. 2008, pp. 81-115.*

The Times Ten Team, Mid-Tier Caching: The Times Ten Approach, Jun. 2002, ACM SIGMOD, pp. 588-593.

Oracle®, "TimesTen to TimesTen Replication Guide" Release 7.0, B31684-03, Sep. 2007, http://download.oracle.com/otn_hosted_doc/timesten/703/TimesTen-Documentation/replication.pdf, 218 pages.

Oracle®, "TimesTen to TimesTen In-Memory Database Introduction" Release 7.0, B31687-03, Sep. 2007, http://download.oracle.com/otn_hosted_doc/timesten/703/TimesTen-Documentation/intro.pdf, 92 pages.

Oracle®, "TimesTen Connect to Oracle Guide" Release 7.0, B31685-03, Sep. 2007, http://download.oracle.com/otn_hosted_doc/timesten/703/TimesTen, 160 pages.

Oracle, "Oracle Times In-Memory Database Architectural Overview" Release 6.0, dated Oct. 26, 2006, http://web.archieve.org/web/20061026030955/http://download-west-oracle.com, 122 pages.

Sergey Melnik et al., "Dremel: Interactive Analysis of WebScale Datasets", Proceedings of the VLDB Endowment, vol. 3, No. 1, dated 2010, 10 pages.

Goldman R. et al., "DataGuides: Enabling Query Formulation and Optimization in Semistructured Databases", Proceedings of International Conference on Very Largedata Bases, dated Aug. 26, 1997, 10 pgs.

Florescu et al., "A Performance Evaluation of Alternative Mapping Schemes for Storing XML Data in a Relational Database", Internet Citation, dated May 13, 1999, 31 pages.

Elmasri, et al., "Fundatmentals of Database Systems," Third Edition, Addison-Wesley Longman, Inc., Copyright © 2000, 26 pages.

Ailamaki, Anastassia, et al, "Weaving Relations for Cache Performance," Proceedings of the 27th International Conference on Very Large Data Bases, Rome, Italy, Sep. 11-14, 2001, 14 pages.

* cited by examiner

Data Guide 201

| PID | PATH | DATATYPE | MIN | MAX |
|---|---|---|---|---|
| 1 | FIRSTNAME | STRING | 4 | 7 |
| 2 | LASTNAME | STRING | 5 | 15 |
| 3 | BORN | {} | | |
| 4 | BORN.CITY | STRING | 8 | 9 |
| 5 | BORN.STATE | STRING | 2 | 2 |
| 6 | BORN.DATE | DATE | 11/08/82 | 09/10/95 |

JSON Object J
{
"FIRSTNAME": "JACK",
"LASTNAME": "SMITH",
"BORN": {

"CITY": "SAN JOSE",
"STATE": "CA",
"DATE": "11/08/82"
},
}

JSON Object K
{
"FIRSTNAME": "TIMOTHY",
"LASTNAME": "JOHNSON-LINCOLN",
"BORN": {

"CITY": "SAN DIEGO",
"STATE": "CA",
"DATE": "09/10/95"
},
}

FIG. 2

Object N

{
    "FIRSTNAME": "JACK",
    "LASTNAME": "SMITH",
    "MIDNAME": "BILL"
  "BORN": {
        "CITY": "EL CAJON",
        "STATE": "CA",
        "DATE": "UNKOWN"
    },
}

FIG. 4

Table 405

| EventID | ParsingEvent |
|---------|--------------|
| E1 | Begin Obj: |
| E2 | Field: "FIRSTNAME" |
| E3 | String Value: 'JACK' |
| E4 | Field: "LASTNAME" |
| E5 | String Value: "SMITH" |
| E6 | Begin Field: "MIDNAME" |
| E7 | String Value: "BILL" |
| E8 | Field: "BORN" |
| E9 | Begin Object: |
| E10 | Field: "CITY" |
| E11 | String Value: "EL CAJON" |
| E12 | Field: "STATE" |
| E13 | String Value: "CA" |
| E14 | Field: "DATE" |
| E15 | String Value: 'UNKOWN' |
| E16 | End Object: |
| E17 | End Object: |

| PID | PATH | DATATYPE | MIN | MAX |
|---|---|---|---|---|
| 1 | FIRSTNAME | STRING | 4 | 7 |
| 2 | LASTNAME | STRING | 5 | 15 |
| 3 | BORN | {} | | |
| 4 | BORN.CITY | STRING | 8 | 9 |
| 5 | BORN.STATE | STRING | 2 | 2 |
| 6 | BORN.DATE | *STRING* | *8* | *8* |
| 7 | *MIDNAME* | *STRING* | *4* | *4* |

Data Guide 201'

FIG. 7

Data Guide 201"

| PID | PATH | DATATYPE | MIN | MAX |
|---|---|---|---|---|
| 1 | FIRSTNAME | STRING | 4 | 7 |
| 2 | LASTNAME | STRING | 5 | 15 |
| 3 | BORN | {} | | |
| 4 | BORN.CITY | STRING | 8 | 9 |
| 5 | BORN.STATE | STRING | 2 | 2 |
| 6 | BORN.DATE | DATE | 11/08/82 | 09/10/95 |
| 7 | MIDNAME | STRING | 4 | 4 |
| 8 | BORN.DATE | STRING | 8 | 8 |

FIG. 8

```
{
    "_id" : "TILL-120613-0959-5124-100-2005-771",
    "StoreTransaction" : {
        "StoreNo" : 5124,
        "PosNo" : 100,
        "CashierNo" : 2005,
        "TicketNo" : 771,
        "EndDateTime" : ISODate("2013-06-12T08:59:50Z")
    },
    "LineItems" : [
        {
            "Identity" : {
                "Code" : "529"
            },
            "Amount" : 200,
            "CancelledAmount" : 0,
            "Units" : {
                "Quantity" : 1,
                "CancelledQuantity" : 0,
                "Price" : 200,
                "Measure" : "E"
            }
        }
        {
            "Identity" : {
                "Code" : "369"
            },
            "Amount" : 600,
            "CancelledAmount" : 0,
            "Units" : {
                "Quantity" : 6,
                "CancelledQuantity" : 0,
                "Price" : 100,
                "Measure" : "E"
            }
        }
    ],
    "Totals" : {
        "TicketAmount" : 800,
        "CashReturned" : 200,
        "SavingsFromPromotions" : 0,
        "SubTotalBeforePromotions" : 800
    },
    "Tenders" : {
        "Cash" : {
            "Amount" : 1000,
            "Change" : -200
        },
        "Cards" : [ ]
    },
    "Discounts" : {

},
    "CountryCode" : "GBR",
    "Currency" : "£"
}
```

FIG. 9

Object V

DATA GUIDE 1001

| PID | Path | DATATYPE |
|-----|------|----------|
| 1 | _id | STRING |
| 2 | StoreTransaction | {} |
| 3 | StoreTransaction.StoreNo | NUMBER |
| 4 | StoreTransaction.PosNo | NUMBER |
| 5 | StoreTransaction.TicketNo | NUMBER |
| 6 | StoreTransaction.EndDateTime | DATE |
| 7 | LineItems | [] |
| 8 | LineItems.Identities | {} |
| 9 | LineItems.Identities.Code | NUMBER |
| 10 | LineItems.Amount | NUMBER |
| 11 | LineItems.CancelledAmount | NUMBER |
| .... | | |

FIG. 10

View SCALAR-VIEW  "Generated by invoking JSON_RelationViewGenerator ('scalar-view', '*')"

Create view scalar-view AS
Select j1.id, j1.StoreNo, j1.PosNo, j1.TicketNo, j1.EndDateTime
From jtab , JSON_TABLE(jtab.jcol, '$._id'
        Columns
            Id varchar(40) path '$._id',
            StoreNo number path '$.StoreTransaction.StoreNo',
            PosNo number path '$.StoreTransaction.PosNo',
            TicketNo number path '$.StoreTransaction.TicketNo',
            EndDateTime number path '$.StoreTransaction.EndDateTime') j1

View SELECTED-SCALAR-VIEW  "Generated by invoking JSON_RelationViewGenerator
('selected-scalar-view', '1,3")"

Create view selected-scaler-view AS
Select j1.id, j1.StoreNo, j1.PosNo, j1.TicketNo, j1.EndDateTime
From jtab , JSON_TABLE(jtab.jcol, '$._id'
        Columns
            Id number path varchar(40) path '$._id',
            StoreNo number path '$.StoreTransaction.StoreNo') j1

View ARRAY-VIEW  "Generated by invoking JSON_RelationViewGenerator ('array-scalar-view', '1,9-11')"

Create view array-view AS
Select j1.id, j2.code, j2.amount, j2.cancelledamount
From jtab , JSON_TABLE(jtab.jcol, '$._id'
        Columns
            Id varchar(40) path '$._id',
            lineItem format json path '$.lineItems') j1,
        JSON_TABLE(j1.lineItem, '$[*]'
        Columns
            Code number path '$.Identities.Code',
            Amount number path '$.Amount',
            Cancelledamount number path 'cancelledamount') j2

FIG. 11

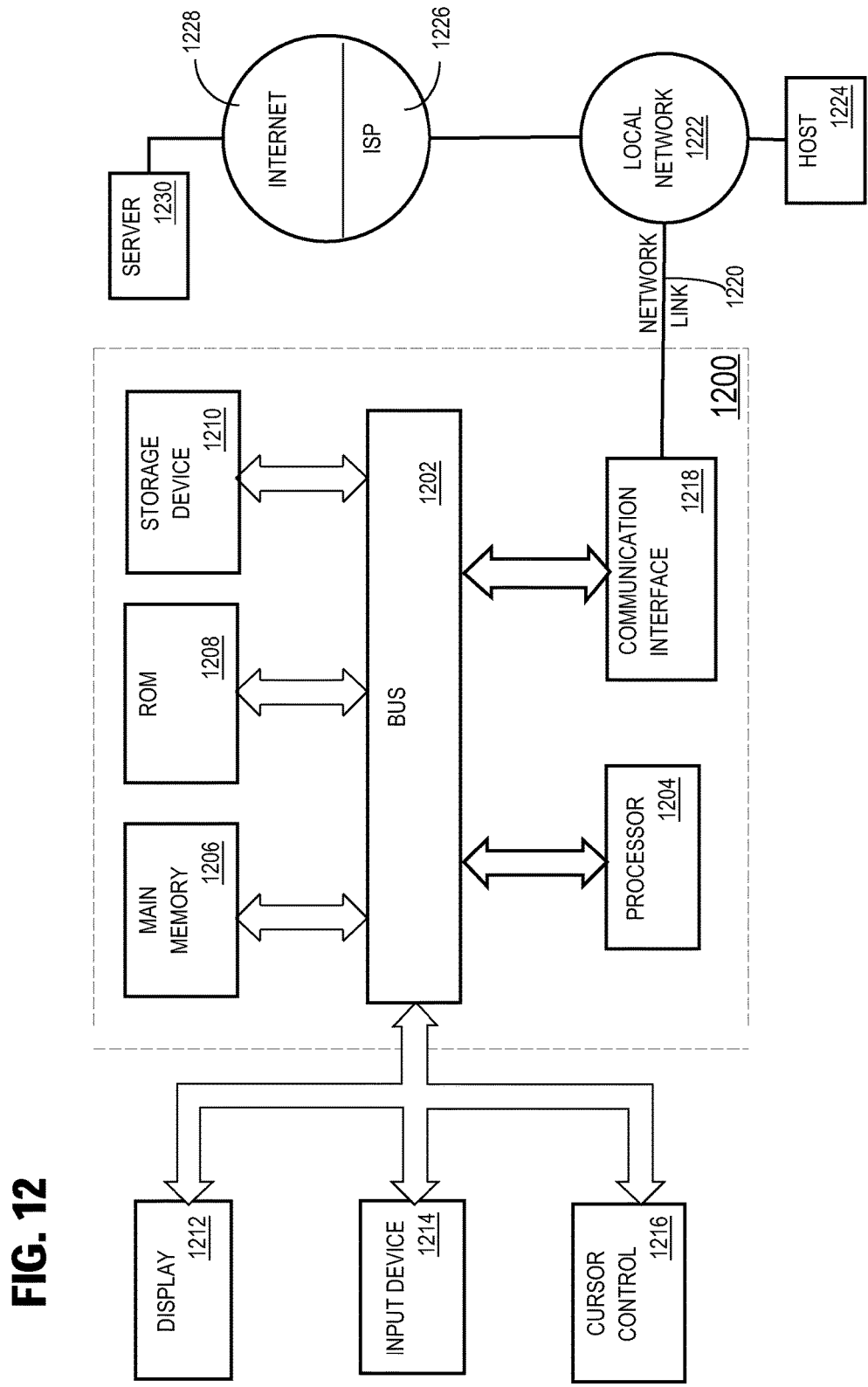

DYNAMICALLY UPDATING DATA GUIDE FOR HIERARCHICAL DATA OBJECTS

FIELD OF THE INVENTION

Embodiments of the present invention relate to storing hierarchically marked-up data.

BACKGROUND

In application development, assumptions about the structure of data that applications use must be made. Once the structure of the data is known, a structure may be assumed and applications developed accordingly. Applications can only run correctly using data that conforms to the structure assumed. Hence, conformance of data used by an application to a schema is important to usability of the data by the application.

In application development, the relational database model has been a dominant data model. A relational database model is schema based, which means that writing data in a relational database requires that the data conform to a schema explicitly defined for the relational database ("explicit schema"). Data in a relational database is very usable because, among other reasons, the data conforms to a known schema defined for the relational database.

The relational database model requires that a schema be developed and implemented within a relational database before database data is stored in the database. This requirement may hinder iterative development of applications, an important ability for many software development endeavors. Under iterative development, changes are made to applications in smaller increments but in a greater number of iterations. As an application changes between iterations, new and/or modified schemas with new or modified fields must be defined for the relational database, possibly requiring downtime and database migration.

Schema-less data models facilitate iterative development of applications. Under the schema-less data model, data may conform to an "implicit schema", and applications may be developed according to the implicit schema. However, the data does not have conform to an explicit schema defined for a database before storing the data in the database. This capability makes it easy to make significant application changes rapidly, without worrying about having first to change the schema of a database and possibly migrate the database to the new schema.

Relational databases are managed by relational database management systems (RDBMS). An RDBMS provides powerful querying capabilities that make data in a relational database very usable, such as the capability to query data using a query language such as SQL and present the data in relational form, as rows with columns. These powerful query capabilities are being extended to cover schema-less data. Thus, RDBMS's are enabled to not only store schema-based data but also schema-less data, providing powerful query capabilities for schema-less data.

Realization of the most powerful query capabilities of an RDBMS depends on an explicit schema, for both schema-based and schema-less data. However, unlike for schema-based data, an explicit schema for schema-less data may be and is often developed after the schema-less data is added to a database.

Defining an explicit schema for schema-less data entails a complex, time-consuming, and error prone manual task. The schema-less data is examined to discover its structure. Statements describing the structure and relational views for accessing the schema-less data are submitted to the RDBMS. Because schema-less data is often hierarchically marked-up, such statements involve writing complicated path expressions. As schema-less data is added, it is examined to discover new structures, and new statements are submitted to the RDBMS to reflect the changes. Because these tasks are time-consuming, development of explicit schemas for schema-less data is delayed, thereby delaying the ability to query schema-less data using the powerful querying capabilities of an RDBMS.

Some aspects of developing explicit schemas for schema-less data may be automated using schema-discovery utilities, which generate schemas for a body of schema-less data. When the schema-discovery utilities are run, the entire body of schema-less data is processed, which may entail significant expenditure of time and computing resources. Schema-definition utilities are often run during off-hours to minimize impact on computing resources. Capturing schema changes to a body of schema-less data entails re-running the schema-discovery utilities against the whole body of schema-less data. The schema generated by schema-discovery utilities is often manually examined before actual implementation in an RDBMS, to ensure that the schemas are feasible. While schema-discovery utilities may alleviate the delay attendant manual development of explicit schemas for schema-less data, the delay is not eliminated and may be significant.

Based on the foregoing, an approach for automatically defining explicit schemas on schema-less data that is faster and consumes fewer computer resources is desirable.

BRIEF DESCRIPTION OF THE DRAWINGS

In the drawings:

FIG. 2 illustrates a data guide according to an embodiment of the present invention.

FIG. 4 illustrates parsing events generated by parsing a JSON hierarchical data object.

FIG. 7 illustrates modifications to a data guide according to an embodiment of the present invention.

FIG. 8 illustrates a JSON hierarchical data object according to an embodiment of the present invention.

FIG. 9 illustrates a data guide according to an embodiment of the present invention.

FIG. 10 illustrates a data guide according to an embodiment of the present invention.

FIG. 11 illustrates relational views of hierarchical objects according to an embodiment of the present invention.

FIG. 12 illustrates a computer system that may be used in an implementation of an embodiment.

DESCRIPTION OF EXAMPLE EMBODIMENTS

Figure 1A:
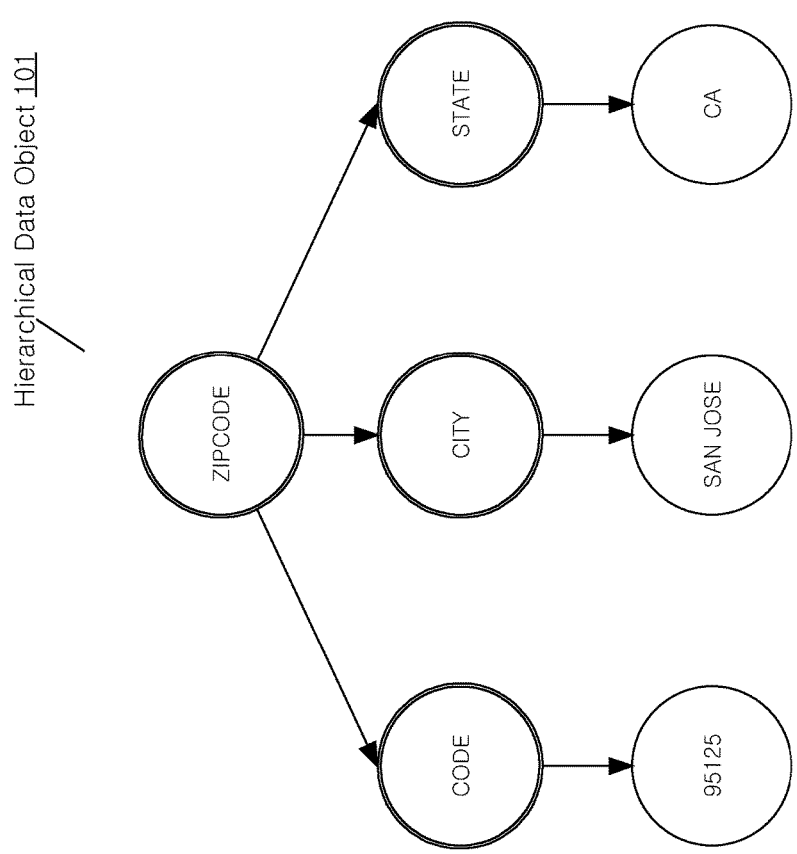
FIG. 1A illustrates XML data as a hierarchical data object comprising nodes according to an embodiment of the present invention.

In the following description, for the purposes of explanation, numerous specific details are set forth in order to provide a thorough understanding of the present invention. It will be apparent, however, that an embodiment of the present invention may be practiced without these specific details. In other instances, structures and devices are shown in block diagram form in order to avoid unnecessarily obscuring the present invention.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in the specification.

Overview

Described herein is an approach for dynamically generating a data guide that describes the structures of hierarchical data objects added to a collection of hierarchical data objects. Examples of hierarchical data objects are documents that conform to XML (Extensible Mark-up Language) or data objects that conform to JSON (JavaScript Object Notation). The data guide may be created and/or updated as hierarchical data objects are added to the collection.

The data guide in effect defines a schema of the hierarchical data objects in the collection. However, according to approaches described herein, the collection of hierarchical data objects may be considered schema-less because a hierarchical data object does not have to conform to a schema to be added to the collection. Further, unlike a schema-based approach, which requires that a hierarchical data object conform to a schema before being added to a collection, a schema is generated in response to adding the hierarchical data object to the collection.

Because of the availability of a schema, hierarchical data objects may be queried using the powerful query capabilities of a RDBMS. According to an embodiment of the present invention, relational views of a collection of hierarchical data objects are generated using a data guide.

Illustrative Hierarchical Data Objects

A dynamic data guide may be used for many types of hierarchical data objects. Hierarchical data objects are data objects marked by a hierarchical mark-up language. An example of a hierarchical mark-up language is XML. Another example is JSON.

Data structured using a hierarchical mark-up language is composed of nodes. Nodes are delimited by a set of delimiters that mark the nodes, and may be tagged with names, referred to herein as tag names. In general, the syntax of hierarchical mark-up languages specify that tag names are embedded, juxtaposed, or otherwise syntactically associated with delimiters that delimit nodes.

For XML data, a node is delimited by start and end tags that comprise tag names. For example, in the following XML fragment X,

```
<ZIPCODE>
    <CODE>95125</CODE>
    <CITY>SAN JOSE</CITY>
    <STATE>CA</STATE>
</ZIPCODE>
``` the start tag <ZIP CODE> and the end tag </ZIP CODE> delimit a node having the name ZIP CODE.

FIG. 1A is a node tree representing the above XML fragment X. Referring to FIG. 1A, it depicts hierarchical data object 101. Non-leaf nodes are depicted with double-line borders, while leaf nodes are depicted with single-line borders. In XML, a non-leaf node corresponds to an element node and a leaf node corresponds to a data node. The element nodes in the node tree are referred to herein by the node's name, which is the name of the element represented by a node. For convenience of exposition, the data nodes are referred to by the value the data nodes represent.

The data between the corresponding tags is referred to as a node's content. For a data node, the content can be a scalar value (e.g. integer, text string, date).

A non-leaf node, such as an element node, contains one or more other nodes. For an element node, the content can be a data node and/or one or more element nodes.

ZIPCODE is an element node that contains child nodes CODE, CITY, and STATE, which are also element nodes. Data nodes 95125, SAN JOSE, and CA are data nodes for element nodes CODE, CITY, and STATE, respectively.

The nodes contained by a particular node are referred to herein as descendant nodes of the particular node. CODE, CITY, and STATE are descendant nodes of ZIPCODE. 95125 is a descendant node of CODE and ZIPCODE, SAN JOSE is a descendant node of CITY and ZIPCODE, and CA is a descendant node of STATE and ZIPCODE.

A non-leaf node thus forms a hierarchy of nodes with multiple levels, the non-leaf node being at the top level. A node at each level is linked to one or more nodes at a different level. Any given node at a level below the top level is a child node of a parent node at the level immediately above the given node. Nodes that have the same parent are sibling nodes. A parent node may have multiple child nodes. A node that has no parent node linked to it is a root node. A node that has no child nodes is a leaf node. A node that has one or more descendant nodes is a non-leaf node.

For example, in container node ZIP CODE, node ZIP CODE is a root node at the top level. Nodes 95125, SAN JOSE, and CA are leaf nodes.

The term "hierarchical data object" is used herein to refer to a sequence of one or more non-leaf nodes, each non-leaf node having a child node. An XML document is an example of a hierarchical data object. Another example is a JSON object.

JSON

JSON is a lightweight hierarchical mark-up language. A JSON object comprises a collection of fields, each of which is a field name/value pair. A field name is in effect a tag name for a node in a JSON object. The name of the field is separated by a colon from the field's value. A JSON value may be:

An object, which is a list of fields enclosed in braces "{ }" and separated within the braces by commas.

An array, which is a list of comma separated JSON nodes and/or values enclosed in square brackets "[ ]".

An atom, which is a string, number, true, false, or null.

The following JSON hierarchical data object J is used to illustrate JSON.

```
{
    "FIRSTNAME": "JACK",
    "LASTNAME": "SMITH",
    "BORN": {
        "CITY": "SAN JOSE",
        "STATE": "CA",
        "DATE": "11/08/82"
    },
}
```

Hierarchical data object J contains fields FIRSTNAME, LASTNAME, BORN, CITY, STATE, and DATE. FIRSTNAME and LASTNAME have atom string values "JACK" and "SMITH", respectively. BORN is a JSON object containing member fields CITY, STATE, and DATE, which have atom string values "SAN JOSE", "CA", and "11/08/82", respectively.

Each field in a JSON object is a non-leaf node and the name of the non-leaf node is the field name. Each non-empty array and non-empty object is a non-leaf node, each empty array and empty object is a leaf node. Data nodes correspond to an atom value.

Figure 1B:
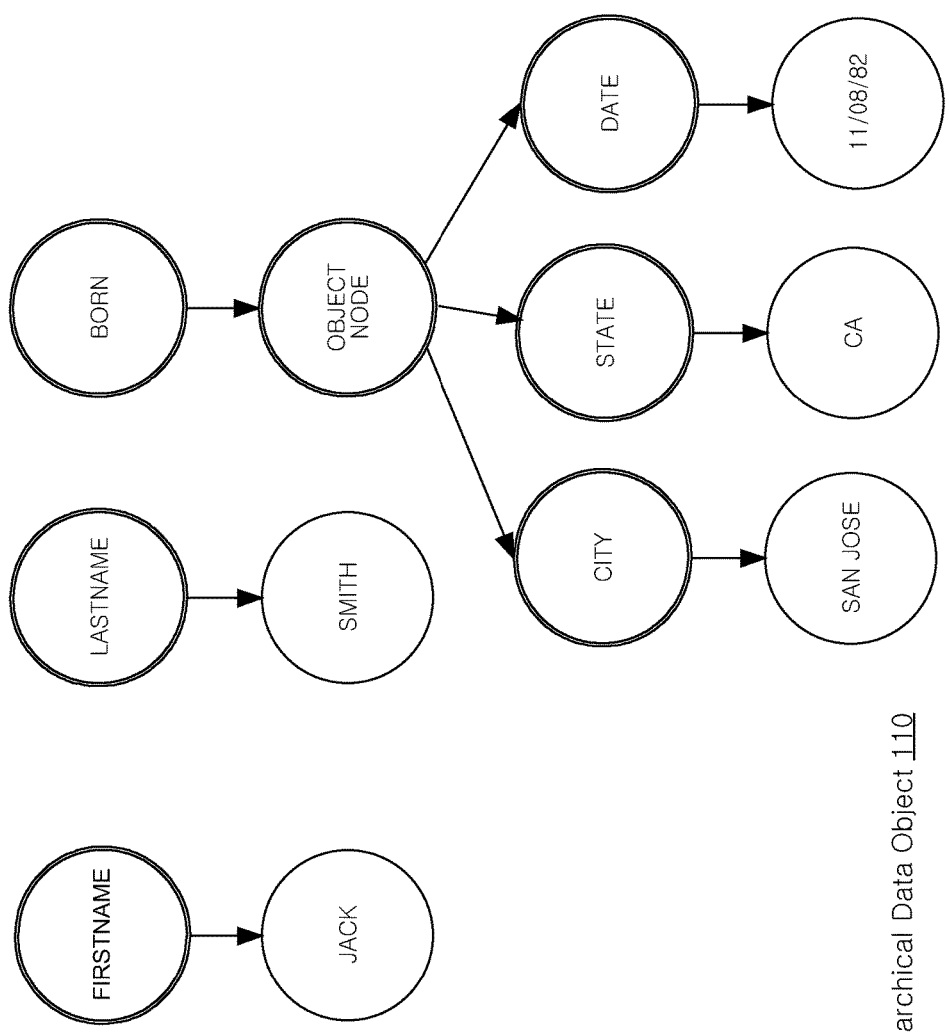
FIG. 1B illustrates a JSON object as a hierarchical data object comprising nodes according to an embodiment of the present invention.

FIG. 1B depicts hierarchical data object J as hierarchical data object 110 comprising nodes as described below. Referring to FIG. 1B, there are three root nodes, which are FIRSTNAME, LASTNAME, and BORN. Each of FIRSTNAME, LASTNAME, and BORN is a field node. BORN has a descendant object node labeled OBJECT NODE.

OBJECT NODE is referred to herein as a containment node because it represents a value that may contain one or more other values. In the case of OBJECT NODE, it represents a JSON object. From the OBJECT NODE three descendant field nodes descend, which are CITY, STATE, and DATE. Another example of a containment node is an object node representing a JSON array.

Nodes FIRSTNAME, LASTNAME, CITY, and STATE have child data nodes representing atom string values "JACK", "SMITH", "SAN JOSE", and "CA", respectively. Node DATE has a descendant data node that represents the date type value "11/08/82".

Paths

A path expression is an expression comprising a sequence of "path steps" that identifies one or more nodes in a hierarchical data object based on each hierarchical position of the one or more nodes. The "path steps" may be delimited by a "/", ".", or another delimiter. Each path step may be a tag name identifying a node in a path to a node within the hierarchical data object. XPath is a query language specifying a path language for path expressions. Another query language is SQL/JSON, being developed by Oracle Corporation in conjunction with others.

In SQL/JSON, an example of a path expression for JSON is "$.BORN.DATE". The step "DATE" specifies a node having the node name "DATE". The step "BORN" specifies the node name of the parent node of node "DATE". The "$" specifies the context of the path expression, which by default is the hierarchical data object for which the path expression is being evaluated.

A path expression may also specify predicates or criteria for a step that a node should satisfy. For example, the following query $.BORN.DATE>TO_DATE(' 1998-09-09', 'YYYY-MM-DD')

specifies that node "BORN.DATE" is greater than the date value '1998-09-09'.

A value path is a path to a node representing a value. JSON values include a JSON object, JSON array, and JSON atom values. Thus, a path to an object, array, or a data node is a value path. Value paths in hierarchical data object J include "$.FIRSTNAME", "$.BORN, and "$.BORN.DATE".

In XML, a value path is a path to a data node. Thus, in XML fragment X, "/ZIPCODE/CODE" and "/ZIPCODE/CITY" are value paths but "/ZIPCODE" is not a value path.

Illustrative Data Guide

FIG. 2 represents an illustrative data guide according to an embodiment of the present invention. A data guide describes the structure of a collection of hierarchical data objects, such as JSON hierarchical data objects. A data guide may also include statistics about the structure, such as the maximum value found at a particular value path within the collection. As shall be explained in greater detail, the data guide is updated as hierarchical data objects are added to a collection of hierarchical data objects. According to an embodiment, a data guide comprises data guide entries, each data guide entry containing a value path found in the collection of hierarchical data objects, and containing data describing data characteristics or properties of the values found at the value path; such data describing one or more data characteristics is referred to herein as a value descriptor.

Referring to FIG. 2, it depicts Data Guide 201. As depicted in FIG. 2, Data Guide 201 reflects the structure of a hierarchical data object collection after adding hierarchical data object J and a hierarchical data object K as the first hierarchical data objects to a collection of hierarchical data objects.

According to an embodiment, Data Guide 201 is a table having entries in the form of rows with columns, each row defining a value path found in a collection of hierarchical data objects. The columns of Data Guide 201 include PID, PATH, DATATYPE, MIN, and MAX.

For a given row in Data Guide 201, column PATH contains a path expression representing a value path found in the collection of hierarchical data objects. PID holds a path identifier assigned to a particular value path. Other columns in Data Guide 201 hold values that together comprise a value descriptor of values found at the particular value path. Fields such as these columns that hold values that describe a data characteristic are referred to herein as value descriptor attributes.

Path value attributes in Data Guide 201 include DATATYPE, MAX, and MIN. DATATYPE contains datatype identifiers that identify the data types of values found at a value path within the collection of hierarchical data objects. Columns MAX and MIN are described later.

Referring to FIG. 2, row 1 in Data Guide 201 holds path identifier 1 in column PID. A row in Data Guide 201 is referred to herein by the path identifier held in the PID column of the row. Row 1 includes path expression FIRSTNAME in column PATH and the value STRING in column DATATYPE, thereby specifying the data type of the values found at this value path is the STRING data type. Note the context step "$" is not in the path expression but may be viewed as being implicitly specified as the first step in the path expression. Row 3 includes path expression BORN in column PATH and the value { } in column DATATYPE, thereby specifying the data type of the values found at this value path belong to the JSON object data type. Row 6 includes path expression BORN.DATE in column PATH and the value DATE in column DATATYPE, thereby specifying the data type of the values found at this value path belong to the JSON date data type.

Columns MIN and MAX hold statistics that are illustrative of the value descriptor attributes that may be stored within a data guide. For a given row, column MIN contains a minimum value about a particular property of the values found at the respective value path with the respective collection of hierarchical data objects. In Data Guide 201, the particular property depends on the data type specified in column DATATYPE. For example, in column MIN in row 1, the value 4 represents the minimum length of any string value. In row 6, the column MIN reflects the earliest date value at the value path, which in this case is 11/08/82.

Similarly for column MAX, column MAX contains a maximum value about a particular property of the values found at the respective value path within the collection. In Data Guide 201, the particular property depends on the data type. For example, in column MAX in row 1, the value 7 represents the maximum length of any string value at value path FIRSTNAME. In row 6, the column MAX reflects the latest date value at the value path, which in this case is 09/10/95.

A data guide may be used to describe many forms of collections of hierarchical data objects, such as hierarchical data objects stored in a database table. According to an embodiment, a collection of hierarchical data objects comprises hierarchical data objects stored in a column having a column data type as XML or as JSON.

A Database Management System ("DBMS")(e.g. RDBMS, object-relational database management system) may support column data types for hierarchical data objects formatted to various hierarchical markup languages, such as XML or JSON. According to an embodiment, a data guide is associated by a DBMS with a particular column defined as a XML or JSON column. Database metadata, such as that found in a data dictionary of a DBMS, associates the column with the data guide.

Dynamically Updating Data Guide

To facilitate the dynamic updating of a data guide when adding a hierarchical data object to a collection of hierarchical data objects, an in-memory tree representation of a data guide is used. The in-memory tree representation is referred to herein as a data guide tree. To dynamically update the data guide, the hierarchical data object is parsed. Parsing a hierarchical data object generates parsing events. As shall be explained in greater detail, the data guide tree is traversed in response to the parsing events, thereby visiting nodes in a data guide tree. Traversing the data guide tree in this way enables efficient detection of changes that need to be made to a data guide to reflect the structure of the hierarchical data object being parsed, as shall be explained in greater detail.

Figure 3:
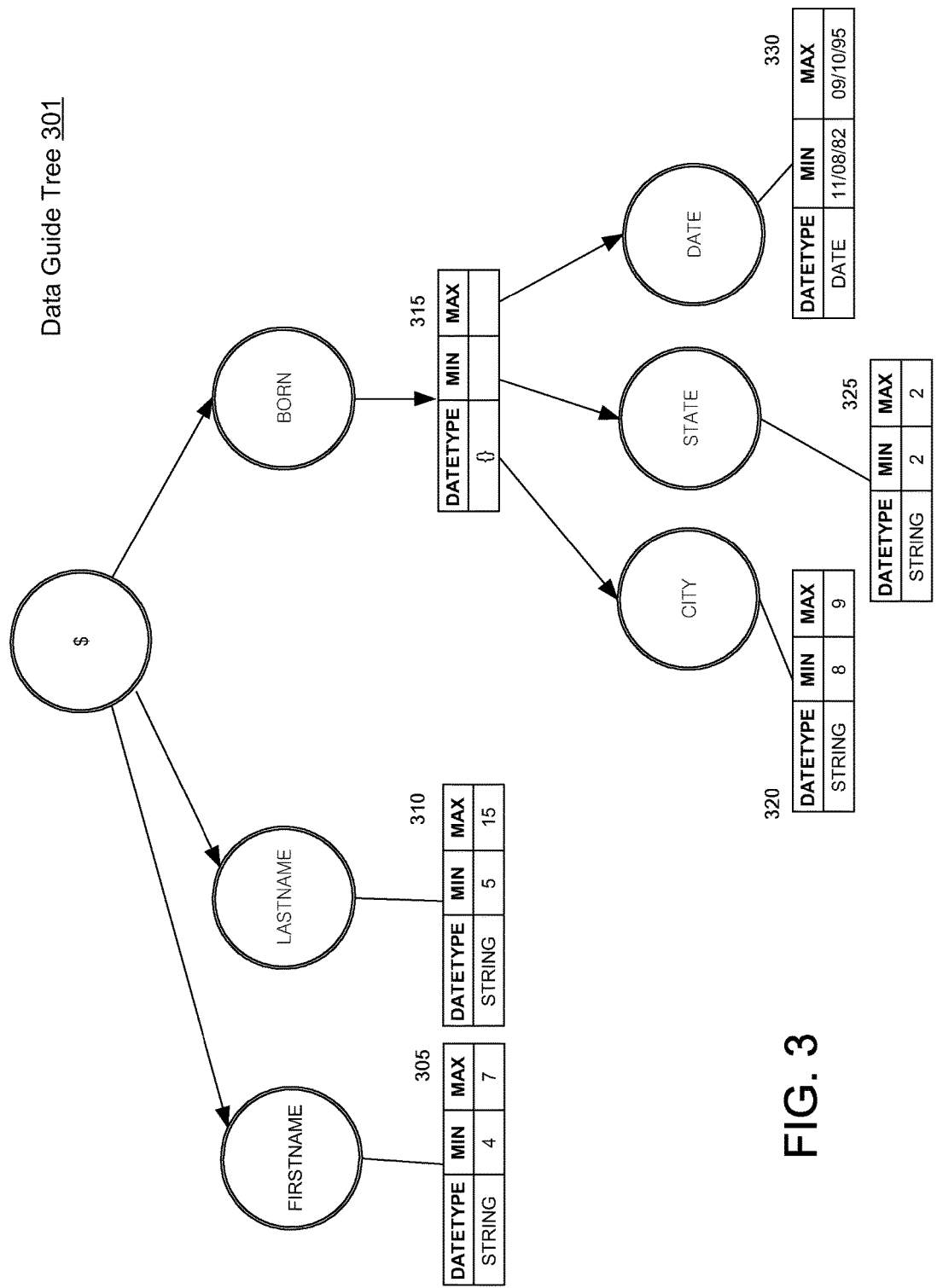
FIG. 3 illustrates a data guide tree according to an embodiment of the present invention.

FIG. 3 illustrates DATA GUIDE TREE 301. DATA GUIDE TREE 301 has a hierarchical tree structure that is in effect defined by Data Guide 201. DATA GUIDE TREE 301 includes two kinds of nodes, a step node and a descriptor node. A step node represents a step found in any value path defined by Data Guide 201, and, in FIG. 3, is depicted by a circle labeled with the name of the step. For example, "$.BORN.STATE" is the value path that corresponds to row 5 in Data Guide 201. Each of nodes $, BORN, and STATE corresponds to a step in path "$.BORN.STATE" that has the same name or label.

In FIG. 3, a value descriptor node corresponds to a value descriptor of a value path. A value descriptor node is depicted by a rectangle along with the value descriptor attributes the value descriptor includes. For example, Descriptor Node 305 represents the value descriptor for "$.FIRSTNAME", the value path for row 1 in Data Guide 201. Descriptor Node 305 includes the value descriptor attributes values for DATATYPE, MIN, and MAX, which are STRING, 4, and 7, respectively.

Descriptor Node 315 represents the value descriptor for "$.BORN", the value path for row 3 in Data Guide 201. Descriptor Node 315 includes the value descriptor attributes values for DATATYPE, which is { }, a JSON object value.

Parsing Events

As mentioned previously, to dynamically update Data Guide 201, DATA GUIDE TREE 301 is traversed in response to parsing events generated while parsing a JSON hierarchical data object. FIG. 4 is an illustrative set of parsing events generated while parsing hierarchical data object N. The parsing events are listed in table 405.

Table 405 includes columns EventID and ParsingEvent. EventID is an id used to identify a parsing event within table 405. A parsing event may be one of various types. Among those depicted are the Begin Obj: event, representing a beginning of a JSON object, the End Obj: parsing event, representing an end of a JSON object, the Field: parsing event, representing a JSON field, and the String Value: parsing event, representing a string atom value. There may be other kinds of parsing events for parsing JSON hierarchical data objects that are not depicted.

The order from top to bottom of the parsing events in table 405 represent the order in which the parsing events are generated when parsing. When parsing hierarchical data object N, the first parsing event generated is parsing event E1, which is a Begin Obj: event. The next parsing event E2 is a Field: parsing event generated in response to encountering field "FIRSTNAME". The next parsing event E3 is a String Value: parsing event generated in response to encountering atom string value "JACK".

Dynamic Updating of Dataguide

Figure 5:
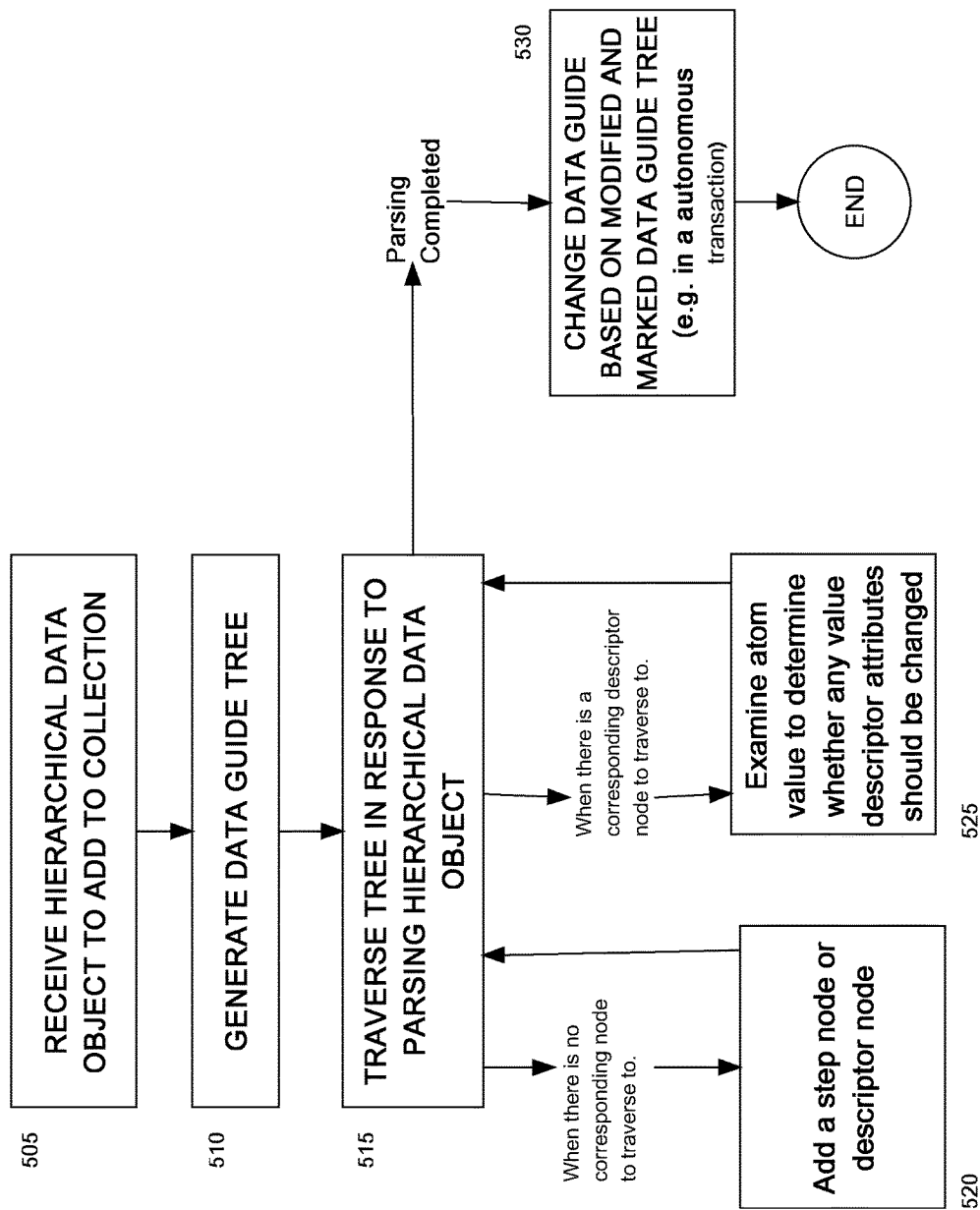
FIG. 5 illustrates a procedure for modifying a data guide using a data guide tree according to an embodiment of the present invention.
Figure 6:
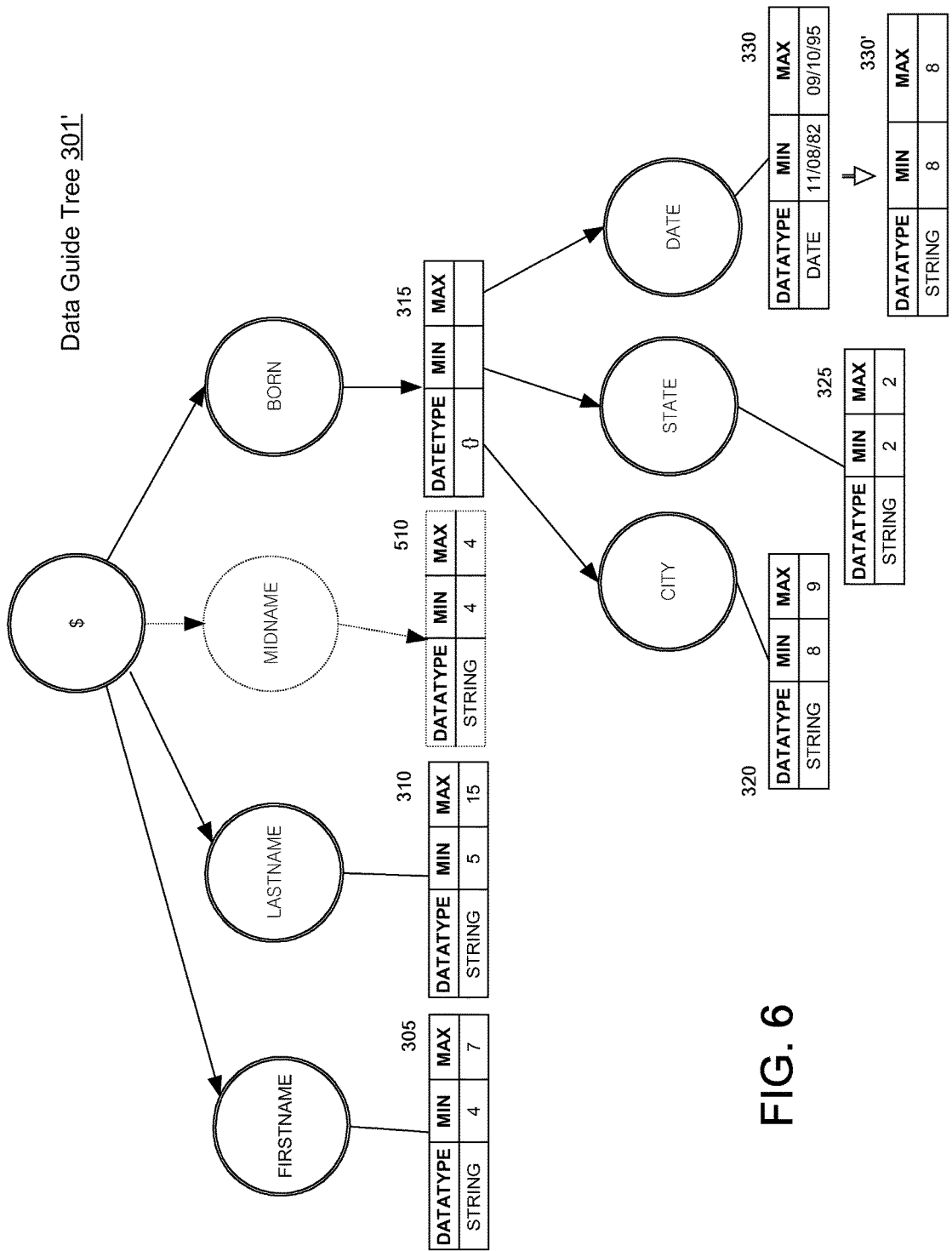
FIG. 6 illustrates a data guide tree as modified during a procedure to modify a data guide according to an embodiment of the present invention.

FIG. 5 is a flow chart depicting a process for dynamically updating Data Guide 201. The process is illustrated in the context of the following scenario. A DBMS is inserting object N into a collection of JSON hierarchical data objects stored in a column of a database table, the column having a column data type of JSON. Data Guide 201 is maintained to describe the structure of the JSON hierarchical data objects in the column. A database dictionary of the DBMS associates the DATA GUIDE TREE 301 with the JSON column. DATA GUIDE TREE 301 is generated to update Data Guide 201 if needed to reflect the structure of object N that is not already reflected in DATA GUIDE TREE 301, if any. As explained below, DATA GUIDE TREE 301 is changed to reflect new value paths encountered during parsing of the object N. FIG. 6 depicts DATA GUIDE TREE 301' as changed based on Object N.

Referring to FIG. 5, at 505, a hierarchical data object to add to a collection is received. In the current illustration, a DBMS receives a database statement to insert object N into the JSON column of a database table.

At 510, a data guide tree is generated. In the current illustration, the DBMS determines that the database dictionary associates Data Guide 201 with the JSON column. In response to this determination, the DBMS generates DATA GUIDE TREE 301.

At 515, the JSON hierarchical data object is parsed, thereby generating parsing events. As the parsing events are generated, the tree is traversed to visit the node in DATA GUIDE TREE 301 that corresponds to the parsing event, if there is such a corresponding node.

At 520, when there is no corresponding node, then a new step or value for a new value path not defined by Data Guide 201 may have been encountered. A step node or descriptor node is added to DATA GUIDE TREE 301 and then traversed to.

At 525, when there is a corresponding node, and the node is a descriptor node, then the parsing event is associated with an atom value. The atom value is examined to determine whether any value descriptor attributes should be changed to reflect the atom value.

In the current illustration, in response to parsing events E1 and E2, step node $ is visited, then step node FIRSTNAME is visited.

In response to parsing event E3, Descriptor Node 305 is visited. Parsing event E3 returns a STRING value for the value path "$.FIRSTNAME" for Descriptor Node 305. The returned STRING value "JAKE" is examined to determine whether value descriptor attributes associated with Descriptor Node 305 should be changed to reflect the returned value "JAKE". In the current example, "JAKE" is a string value, which matches the DATATYPE value descriptor attribute for Descriptor Node 305. The length of "JAKE" is at least equal to value of MIN and not greater than the value of MAX. No value descriptor attributes for Descriptor Node 305 need to be changed.

The next parsing events generated are E4 and E5. In response to these events, nodes FIRSTNAME and LASTNAME are visited.

Next, parsing event E6 is generated, which is a Begin Field: event for field "MIDNAME". There is no such step node field to traverse to from step node LASTNAME. Thus, a new step has been detected and a new step node MIDNAME is added to DATA GUIDE TREE 301'. Step node MIDNAME is traversed to and visited.

Next, parsing event E7 is generated, which is a String Value: parsing event that returns the string "BILL". There is no descriptor node to traverse to from descriptor node MIDNAME. Thus, a value for a new value path has been detected and new descriptor node 510 is added to DATA GUIDE TREE 301'. Based on the atom string value "BILL", the value descriptor attributes of the new descriptor node are as shown in FIG. 6.

The next parsing events generated are E8, E9, E10, E11, E12, E13, and E14. In response to these parsing events, descriptor node BORN, descriptor node 315, step node CITY, descriptor node 320, step node STATE, descriptor node 325, and step node DATE, are visited, respectively.

The next parsing event generated is parsing event E15, which returns STRING value "UNKNOWN". Descriptor Node 330 is visited, and the value descriptor attributes are compared with the STRING value.

Based on the comparison, it is determined that the data type specified for Descriptor Node 330 does not match the data type of the value returned by parsing. Descriptor Node 330 specifies a data type of DATE while the data type of the string value is STRING. Thus, the data types of values at the value path that correspond to Descriptor Node 330 are overloaded. When this situation occurs for a value path, the value path is referred to herein as being overloaded. When the values at a value path are overloaded, a blanket data type is used to describe the data types of the values. According to an embodiment, a blanket data type that is used to describe values of overloaded value paths is STRING. For example, when the value path's values are a mix of INTEGER and STRING, or a mix of STRING and DATE, the blanket data type used to cover both data types is STRING.

In the current illustration, the value descriptor attributes of Descriptor Node 330 are changed to reflect the overloading, as depicted by Descriptor Node 330' in FIG. 6. Specifically, the value descriptor attributes DATATYPE, MIN, and MAX are set to "STRING", 8, and 8, respectively.

After parsing is complete, then at 530, Data Guide 201 is changed to reflect any changes made to DATA GUIDE TREE 301. In general, for each new descriptor node, a new row for a value path is inserted into Data Guide 201. For each changed descriptor node, the corresponding row in Data Guide 201 is updated to reflect the change to the descriptor node.

For the current illustration, FIG. 7 shows the changes made to Data Guide 201 to reflect any changes made to DATA GUIDE TREE 301. Referring to FIG. 7, it depicts Data Guide 201', a version of Data Guide 201 after being changed to reflect any changes made to DATA GUIDE TREE 301 when parsing object N. Row 6 shows that for value path "$.BORN.DATE", DATATYPE, MIN, and MAX have been changed to "STRING", 8, and 8, respectively. New row 7 is for a new value path "$.MIDNAME", with DATATYPE, MIN, with MAX being set to "STRING", 4, and 4, respectively.

Alternatives for Handling Overloaded Value Paths

In an embodiment of the present invention, when an overloaded value path is encountered during parsing, rather than using a blanket data type, another instance of the value path is added to the data guide.

FIG. 8 illustrates Data Guide 201" after adding another instance of value path "BORN.DATE", an overloaded value path, as row 8. The adding of the other instance is explained in the context of the previous illustration used for FIG. 5 where Data Guide Tree 301 is generated.

In response to parsing event EIS returning STRING value "UNKOWN", Descriptor Node 330 is visited. It is determined the data type STRING does not match the DATE data type specified by Descriptor Node 330. In response, a new descriptor node (not shown) is added to the Data Guide Tree 301, with DATATYPE, MIN, and MAX being set to "STRING", 8, and 8, respectively. At 530, for the new descriptor node, row 8 is added to record another instance of value path "BORN.DATE" in Data Guide 201".

Efficiency Considerations

As mentioned previously, traversing the data guide tree when parsing a hierarchical data object enables efficient determination of any changes required for the respective data guide. This benefit is obtained, at least in part, because a data guide tree is represented by an in-memory hierarchical-tree data structure, with elements that each represent a node and that are directly linked to elements that represent direct descendants of the node as well as the direct antecedents of the node. The elements are traversed to and visited in response to parsing events. To handle a parsing event involving a new sub-element of the current element being visited, only the elements linked to the current element need be examined to determine what element to traverse to for the parsing event. If there is no such element, then there is no corresponding node in the data guide tree for the parsing event, and a step for a new value path may have been detected.

This approach is more efficient than other alternatives. One such alternative is to scan the data guide or an index of the data guide for each parsing event to determine whether a new step has been encountered.

A hierarchical data object may be added to a collection in a database table as part of a database transaction adding multiple hierarchical data objects. In addition, multiple database sessions may be concurrently inserting hierarchical data objects into the database table. As a consequence, multiple database sessions may be modifying the same data guide, causing access contention to the data guide and concomitant delay. The delay may be exacerbated by a long running transaction that locks a row in the data guide until the entire transaction is committed.

According to an embodiment, to minimize locking and contention for a data guide, the data guide is updated by an autonomous transaction within a parent transaction that is inserting a hierarchical data object into a database table. Thus, for multiple hierarchical data objects being inserted into a database table by a transaction, multiple autonomous transactions may be started and committed for any hierarchical data object triggering data guide changes. An autonomous transaction allows leaving the context of the calling parent transaction, performing the autonomous transaction as an independent transaction, and returning to the parent transaction without affecting the parent transaction's state.

According to an embodiment, the value descriptor attributes type maintained in a data guide are limited to kinds that may be determined to a level of reasonable accuracy based on simple computations with data that is readily at hand when adding a hierarchical data object, information such as the current value descriptor attributes in a data guide tree and the values from the hierarchical data object being parsed. For example, aggregations such as MAX and MIN may be reliably determined by simply comparing the current MAX and MIN values to the length of an atom string value generated by parsing.

According to an embodiment, value attribute descriptors are only updated for certain types of operations that modify hierarchical data objects, such as adding a hierarchical data object to a collection, to avoid complex computation required to compute value attribute values with reasonable accuracy for other types of operations that modify hierarchical data objects. For example, when deleting a hierarchical data object, a minimum or maximum calculation depends on values in other remaining hierarchical data objects that would have to be scanned in order to calculate a new minimum or maximum with reasonable accuracy. To avoid overhead of such a computation, value attribute descriptors are not updated or otherwise processed when deleting a hierarchical data object.

The procedure of dynamically updating a data guide when adding a hierarchical data object to a collection may add significant overhead to the process of adding hierarchical data objects to a collection. Parsing a hierarchical data object and particularly updating the data guide using autonomous transactions creates significant overhead. As a collection of hierarchical data objects grows, the frequency of encountering changes that need to be made to a data guide dwindles. Thus, the cost of this overhead endures past the point where any benefit is realized by capturing new information for the data guide.

Such overhead may be minimized by incorporating parsing-based operations performed as part of dynamic data guide updating into parsing operations that may be performed for another function or purpose when adding a hierarchical data objects to a collection. For example, in a DBMS, when a hierarchical data object is added to a collection, a hierarchical data object is parsed to validate the hierarchical data object, to determine compliance with a hierarchical mark-up language. Such parsing may also be used to perform operations related to maintaining a data guide. Thus, rather than parsing a hierarchical data object during validation and reparsing the hierarchical data object again to detect any data guide changes, the hierarchical data object is parsed once for both validation and a determination of whether there are changes to effect within a data guide.

According to an embodiment, during validation of a hierarchical data object when adding an hierarchical data object to a collection, a data guide tree is generated. In response to parsing events generated when parsing the hierarchical data object, the data guide tree is traversed and changed as needed as described previously (see steps 520 and 525). If a change to the data guide tree is detected (see step 530), then the validation process returns a flag or otherwise sends a signal to indicate that the data guide may need to be updated.

In response to the signal that indicates that the data guide may need to be updated, the full process of updating the data guide tree is undertaken, as depicted in FIG. 5.

Note the process of updating the data guide tree, including execution of transactions to modify the data guide tree, may be incorporated into the process of validation. However, this approach could require changing validation utilities to update a data guide. Validation utilities may be used under the assumption that the behavior of validation utilities does not include executing database transactions. Incorporating the updating of a data guide into a validation utility would have the undesirable affect of violating this assumption.

Automatic Generation of Views

DBMS's may provide the capability to define views that present data from hierarchical data objects as relational data. However, defining such views may entail manually writing DDL statements that having complicated path expressions and relational constructs to specify what values in the hierarchical data object to present in a relational view, a manual task that can be error prone. Information in a data guide may be used to automatically generate a view of a collection of hierarchical data objects, thereby avoiding the need to manually write complex DDL statements.

According to an embodiment of the present invention, a utility is provided that automatically generates a DDL statement that may be submitted to a DBMS to generate a view. Arguments for the utility may be used to specify a name for the view and which value paths to present in the relational view. The utility is referred to herein as JSON_RelationViewGenerator, and is described later in further detail.

To illustrate automated generation of relational views, an illustrative JSON object and data guide is provided in FIGS. 9 and 10. FIG. 9 depicts an object V. Object V includes an array LineItems.

FIG. 10 depicts DATA GUIDE 1001. FIG. 10 depicts relational views that may be generated using JSON_RelationViewGenerator.

Referring to FIG. 10, DATA GUIDE 1001 is a data guide for a column jcol in a table jtab (see DDL statements in FIG. 10). The value path values depicted in FIG. 10 are generated from object V. DATA GUIDE 1001 may also include value descriptor attributes that are not depicted in FIG. 10.

The relational views are represented in FIG. 11 by DDL statements that may be used to define the views. Such DDL statements are generated by JSON_RelationViewGenerator.

Referring to FIG. 11, view SCALAR-VIEW is a view of scalar values that are not embedded within an array structure. According to an embodiment, JSON_RelationViewGenerator takes several arguments, which include a first argument ("view name argument") denoting the view name "scalar-view", and a second argument ("path id argument") denoting "*", specifying to return all fields for scalar values that are not nested within an array.

JSON_RelationViewGenerator may take one or more additional arguments to identify the table and JSON column that stores a collection for which to generate a view, and to identify the data guide.

JSON_RelationViewGenerator is configured to generate a view with column names having the same name as a corresponding field in a JSON hierarchical data object. Generating a view in this way is accomplished through the use of the JSON_TABLE table function, which returns values from a JSON hierarchical data object as relational column values. An embodiment of the JSON_TABLE function is described in Oracle® Database, SQL Language Reference, 12c Release 1 (12.1), E41329-12, pages 145-165, the contents of which are incorporated herein by reference.

The JSON_TABLE table function declaration view includes arguments for a columns clause that specifies columns to return, and for each column, a column name, column data type, and path expression that resolves to a JSON value to return. For example, in view SCALAR-VIEW, the column clause argument Id varchar(40) path '$._id' specifies column name id, the data type varchar(40), and the path expression '$._id'; the column clause argument StoreNo number path '$.StoreTransaction.StoreNo' specifies column name StoreNo, data type number, and path expression '$.StoreTransaction.StoreNo'.

When JSON_RelationViewGenerator is invoked, the utility examines the data guide to determine which rows represent fields for scalar values that are not nested within an array. JSON_RelationViewGenerator uses information in the data guide to generate a DDL statement defining a relational view. For example, JSON_RelationViewGenerator uses value paths in column PATH and data types in column DATATYPE to determine how to define columns in the column clause of view SCALAR-VIEW.

View SELECT-SCALAR-VIEW projects columns of specific value paths specified by a path id argument, the argument value being '1,3'. This value lists path identifiers that identify rows of value paths in DATA GUIDE 1001. Hence, view SELECT-SCALAR-VIEW includes columns for value paths '$._id' and '$.StoreTransaction.StoreNo'.

Likewise, view ARRAY-VIEW projects columns of value paths specified by the path id argument. View ARRAY-VIEW projects columns of specific value paths specified by the path id argument, the argument value being '1,9-11'. This value lists path identifiers that identify rows of value paths in DATA GUIDE 1001. Among these value paths are value paths for fields of elements of an array. To project the array elements, ARRAY-VIEW includes a join between two JSON_TABLE table functions. JSON_TABLE function J returns three columns Code, Amount, and Cancelledamount.

Data Guides for Transient Hierarchical Data Object

Many processes and computer operations may dynamically generate hierarchical data objects that are transient, that is, hierarchical data objects that are not stored persistently. A data guide may be generated for such hierarchical objects so that the structure of a collection of transitory hierarchical data objects generated by certain processes or operations is discoverable and described.

An example of a process or computer operation that returns transient hierarchical data objects is the execution of a database query returning hierarchical objects of a JSON column of a table or view. According to an embodiment, a user defined aggregate function may be implemented to generate a data guide of a collection of transient hierarchical data objects generated by a query.

For example, a user-defined aggregate function generates a data guide for the following query J1.

```
J1:
SELECT DATA-GUIDE-AGGREGATION(JCOL)
FROM J_COLLECTION
WHERE JSON_EXISTS(JCOL, '$.ORDERS%(@PRICE > 300)%')
```

The function DATA-GUIDE-AGGREGATION(JCOL) is a user-defined aggregate function that takes a column of the JSON column data type, which in query J1 is column JCOL in table J_COLLECTION. Query J1 returns a collection of transitory hierarchical data objects from JCOL having a field ORDER that is greater than 300. The function DATA-GUIDE-AGGREGATION(JCOL) receives the hierarchical data objects and generates or updates a data guide for these transitory hierarchical data objects.

Database Systems

Embodiments of the present invention are used in the context of DBMS's. Therefore, a description of a DBMS is useful.

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMS's, the data containers are referred to as tables, the records are referred to as rows, and the fields are referred to as columns. In object-oriented databases, the data containers are referred to as object classes, the records are referred to as objects, also referred to herein as object records, and the fields are referred to as attributes. Other database architectures may use another terminology.

A database dictionary comprises metadata that defines database objects physically or logically contained in a database. In effect, a database dictionary defines the totality of a database. Database objects include tables, indexes, views, columns, data types, users, user privileges, and storage structures, such as table spaces, which are used for storing database object data.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database statement may be in the form of a database statement that conforms to a syntax of a database language. One example language for expressing database statements is the SQL. DDL statements are issued to a DBMS to define database structures such as tables, views, or complex data types. For instance, CREATE, ALTER, DROP, and RENAME, are examples of DDL commands found in some SQL implementations. When DDL statements are issued to create a database object or to modify a database object, the database dictionary is modified to define the database objects accordingly. DML commands are issued to a DBMS to manage data stored within a database structure. For instance, SELECT, INSERT, UPDATE, and DELETE are common examples of DML instructions found in some SQL implementations. SQL/XML and SQL/JSON are extensions of SQL used when manipulating XML data in an object-relational database.

Although the examples described above are based on Oracle's SQL, the techniques provided herein are not limited to Oracle's SQL, to any proprietary form of SQL, to any standardized version or form of SQL (ANSI standard), or to any particular form of database command or database language. Furthermore, for the purpose of simplifying the explanations contained herein, database commands or other forms of computer instructions may be described as performing an action, such as creating tables, modifying data, and setting session parameters. However, it should be understood that the command itself performs no actions, but rather the DBMS, upon executing the command, performs the corresponding actions. Thus, such statements as used herein, are intended to be shorthand for commands, that when executed by the DBMS, cause the DBMS to perform the corresponding actions.

Storage of Hierarchical Data Objects

Various types of storage mechanisms are used to store hierarchical data objects, such as XML documents. One type of storage mechanism stores a hierarchical data object as a text file in a file system. As mentioned previously, another type of mechanism for storing hierarchical data objects is a DBMS. In a DBMS, a hierarchical data object may be stored in a row of a table and nodes of the hierarchical data object are stored in separate columns in the row. An entire hierarchical data object may also be stored in a lob (large object) in a column. A hierarchical data object may be shredded and stored as a hierarchy of objects in a database; each object is an instance of an object class and stores one or more elements of a hierarchical data object. Tables and/or objects of a database system that hold hierarchical data objects are referred to herein as base tables or objects.

Binary-token encoding is another form in which hierarchical data objects may be stored in a database. Binary-token encoding generates is a compact binary representation of a hierarchical data object that is designed to reduce the size of hierarchical data objects. One of the ways binary-token encoding encodes hierarchical data objects is by representing strings with fixed values.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or solid-state drive is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1210. Volatile media includes dynamic memory, such as main memory 1206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution. A computer system process comprises an allotment of processor time, and an allotment of memory (physical and/or virtual), the allotment of memory being for storing instructions executed by the processor, for storing data generated by the processor executing the instructions, and/or for storing the processor state (e.g. content of registers) between allotments of the processor time when the computer system process is not running. Computer system processes run under the control of an operating system, and may run under the control of other programs being executed on the computer system.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a hierarchical data object;
   in response to receiving the hierarchical data object:
   generating a data guide representation of a data guide, wherein said data guide includes data guide entries, each data guide entry of said data guide entries being associated with a respective value path and one or more value descriptor attributes that each specifies a data characteristic about one or more values found at said respective value path;
   parsing said hierarchical data object;
   based on the parsing, determining a particular value path within said hierarchical data object;
   based on the data guide representation, determining whether said data guide defines said particular value path;
   when said data guide does not define said particular value path, generating a new data guide entry in said data guide associated with said particular value path and one or more value descriptor attribute values that each specify a data characteristic about a value found at said particular value path in said hierarchical data object;
   when said data guide does define said particular value path:
   determining whether to change the one or more value descriptor attribute values associated with the particular value path based on a particular value found at said particular value path; and
   when determining to change the one or more value descriptor attribute values associated with the particular value path, changing a data guide entry in said data guide to reflect said change.

2. The method of claim 1, wherein determining to change the one or more value attribute descriptors includes determining to change a value attribute descriptor that describes a data type of values at said particular value path within a collection of hierarchical data objects.

3. The method of claim 1, wherein determining to change the one or more value attribute descriptors includes determining to change a value attribute descriptor that describes an aggregation based on values at said particular value path within a collection of hierarchical data objects.

4. The method of claim 1, further including:
   a particular transaction storing said hierarchical data object in a database; and
   wherein said changing a data guide entry in said data guide is performed by an autonomous transaction executing within said particular transaction.

5. The method of claim 1, further including:
   wherein a collection of hierarchical data objects is stored in a database table; and
   generating a relational view based on said data guide and said database table.

6. The method of claim 5, wherein generating a relational view includes:
   generating one or more DDL ("Date Definition Language") statements that include path expressions generated based on path expressions specified by said data guide.

7. The method of claim 5, wherein generating a relational view includes:
   generating one or more DDL ("Date Definition Language") statements that include path expressions generated based on path expressions specified by said data guide.

8. The method of claim 5, further including generating one or more DDL statements that include:

path expressions generated based on path expressions specified by said data guide, and
one or more table functions.

9. The method of claim 1, wherein receiving comprises receiving hierarchical data object to add to a collection of hierarchical data objects.

10. The method of claim 1, wherein said hierarchical data object is a transitory hierarchical data object.

11. The method of claim 10, wherein said hierarchical data object belongs to a plurality of transitory hierarchical data objects generated by execution of a query, wherein said query references an aggregate function that takes as input said plurality of transitory hierarchical data objects, wherein execution of said query comprises executing said aggregate function thereby causing generation of said data guide to describe said plurality of transitory hierarchical data objects.

12. The method of claim 1, further including:
prior to generating said data guide representation, validating said hierarchical data object, wherein validating comprises:
parsing said hierarchical data object thereby generating a stream of parsing events;
traversing another data guide representation in response to said stream of parsing events;
detecting a need to change said data guide;
returning an indication of said need to change said data guide.

13. A method comprising:
receiving a hierarchical data object to add to a collection of hierarchical data objects;
in response to receiving the hierarchical data object:
generating a data guide tree representation of a data guide, wherein:
said data guide includes data guide entries, each data guide entry of said data guide entries being associated with a respective value path belonging to a plurality of value paths and one or more value descriptor attributes that each specifies a data characteristic about one or more values found at said respective value path;
wherein said data guide tree representation includes a node for each step found in said plurality of value paths and a node for each value path of said plurality of value paths;
parsing said hierarchical data object thereby generating a stream of parsing events that includes a plurality of parsing events;
for each parsing event of said plurality of parsing events;
determining whether said data guide tree representation defines a particular node corresponding to said parsing event;
when said data guide tree representation does not define a particular node corresponding to said parsing event:
adding a new node to said data guide tree representation,
when said parsing event corresponds to a particular value at a particular value path in said hierarchical data object, associating said new node with one or more value descriptor attributes; and
when said data guide tree representation does define a particular node corresponding to said parsing event:
determining whether to change one or more value descriptor attributes associated with said particular node when said parsing event corresponds to a particular value at a particular value path in said hierarchical data object.

14. The method of claim 13, further including modifying said data guide based on changes made to said data guide tree representation for said hierarchical data object.

15. One or more non-transitory storage media storing sequences of instructions which, when executed by one or more computing devices, cause:
receiving a hierarchical data object;
in response to receiving the hierarchical data object:
generating a data guide representation of a data guide, wherein said data guide includes data guide entries, each data guide entry of said data guide entries being associated with a respective value path and one or more value descriptor attributes that each specifies a data characteristic about one or more values found at said respective value path;
parsing said hierarchical data object;
based on the parsing, determining a particular value path within said hierarchical data object;
based on the data guide representation, determining whether said data guide defines said particular value path;
when said data guide does not define said particular value path, generating a new data guide entry in said data guide associated with said particular value path and one or more value descriptor attribute values that each specify a data characteristic about a value found at said particular value path in said hierarchical data object;
when said data guide does define said particular value path:
determining whether to change the one or more value descriptor attribute values associated with the particular value path based on a particular value found at said particular value path; and
when determining to change the one or more value descriptor attribute values associated with the particular value path, changing a data guide entry in said data guide to reflect said change.

16. The one or more non-transitory storage media of claim 15, wherein determining to change the one or more value attribute descriptors includes determining to change a value attribute descriptor that describes a data type of values at said particular value path within a collection of hierarchical data objects.

17. The one or more non-transitory storage media of claim 15, wherein determining to change the one or more value attribute descriptors includes determining to change a value attribute descriptor that describes an aggregation based on values at said particular value path within a collection of hierarchical data objects.

18. The one or more non-transitory storage media of claim 15, the sequences of instructions further including instructions that, when executed by one or more computing devices, cause:
a particular transaction storing said hierarchical data object in a database; and
wherein said changing a data guide entry in said data guide is performed by an autonomous transaction executing within said particular transaction.

19. The one or more non-transitory storage media of claim 15, the sequences of instructions further including instructions that, when executed by one or more computing devices, cause:

wherein a collection of hierarchical data objects is stored in a database table; and
generating a relational view based on said data guide and said database table.

20. The one or more non-transitory storage media of claim 19, wherein generating a relational view includes:
generating one or more DDL ("Date Definition Language") statements that include path expressions generated based on path expressions specified by said data guide.

21. The one or more non-transitory storage media of claim 19, wherein generating a relational view includes:
generating one or more DDL ("Date Definition Language") statements that include path expressions generated based on path expressions specified by said data guide.

22. The one or more non-transitory storage media of claim 19, the sequences of instructions further including instructions that, when executed by one or more computing devices, cause:
generating one or more DDL statements that include:
path expressions generated based on path expressions specified by said data guide, and
one or more table functions.

23. The one or more non-transitory storage media of claim 15, wherein receiving comprises receiving a hierarchical data object to add to a collection of hierarchical data objects.

24. The one or more non-transitory storage media of claim 15, wherein said hierarchical data object is a transitory hierarchical data object.

25. The one or more non-transitory storage media of claim 24, wherein said hierarchical data object belongs to a plurality of transitory hierarchical data objects generated by execution of a query, wherein said query references an aggregate function that takes as input said plurality of transitory hierarchical data objects, wherein execution of said query comprises executing said aggregate function thereby causing generation of said data guide to describe said plurality of transitory hierarchical data objects.

26. The one or more non-transitory storage media of claim 15, the sequences of instructions further including instructions that, when executed by one or more computing devices, cause:
prior to generating said data guide representation, validating said hierarchical data object, wherein validating comprises:
parsing said hierarchical data object thereby generating a stream of parsing events;
traversing said data guide representation in response to said stream of parsing events;
detecting a need to change said data guide;
returning an indication of said need to change said data guide.

27. One or more non-transitory storage media storing sequences of instructions which, when executed by one or more computing devices, cause:
receiving a hierarchical data object to add to a collection of hierarchical data objects;
in response to receiving the hierarchical data object:
generating a data guide tree representation of a data guide, wherein:
said data guide includes data guide entries, each data guide entry of said data guide entries being associated with a respective value path belonging to a plurality of value paths and one or more value descriptor attributes that each specifies a data characteristic about one or more values found at said respective value path;
wherein said data guide tree representation includes a node for each step found in said plurality of value paths and a node for each value path of said plurality of value paths;
parsing said hierarchical data object thereby generating a stream of parsing events that includes a plurality of parsing events;
for each parsing event of said plurality of parsing events;
determining whether said data guide tree representation defines a particular node corresponding to said parsing event;
when said data guide tree representation does not define a particular node corresponding to said parsing event:
adding a new node to said data guide tree representation,
when said parsing event corresponds to a particular value at a particular value path in said hierarchical data object, associating said new node with one or more value descriptor attributes; and
when said data guide tree representation does define a particular node corresponding to said parsing event:
determining whether to change one or more value descriptor attributes associated with said particular node when said parsing event corresponds to a particular value at a particular value path in said hierarchical data object.

28. The one or more non-transitory storage media of claim 27, the sequences of instructions further including instructions that, when executed by one or more computing devices, cause modifying said data guide based on changes made to said data guide tree representation for said hierarchical data object.

* * * * *

UNITED STATES PATENT AND TRADEMARK OFFICE
CERTIFICATE OF CORRECTION

PATENT NO. : 9,864,816 B2
APPLICATION NO. : 14/699685
DATED : January 9, 2018
INVENTOR(S) : Liu et al.

It is certified that error appears in the above-identified patent and that said Letters Patent is hereby corrected as shown below:

On the Title Page

On page 2, Column 2, item (56), under Other Publications, Line 34, delete ""Fundatmentals" and insert -- "Fundamentals --, therefor.

In the Drawings

On sheet 5 of 13, in FIG. 4, Line 11, delete ""UNKOWN"" and insert -- "UNKNOWN" --, therefor.

On sheet 5 of 13, in FIG. 4, under Table 405, Line 17, delete ""UNKOWN"" and insert -- "UNKNOWN" --, therefor.

In the Specification

In Column 5, Line 52, delete "(' 1998-" and insert -- ('1998- --, therefor.

In Column 10, Line 19, delete ""UNKOWN"," and insert -- "UNKNOWN", --, therefor.

In the Claims

In Column 19, Line 5, delete "receiving hierarchical" and insert -- receiving a hierarchical --, therefor.

Signed and Sealed this
Seventeenth Day of July, 2018

Andrei Iancu
*Director of the United States Patent and Trademark Office*